May 13, 1952    D. E. WARREN ET AL    2,596,879
MOTOR VEHICLE HEADLIGHT MARKER
Filed Sept. 27, 1949
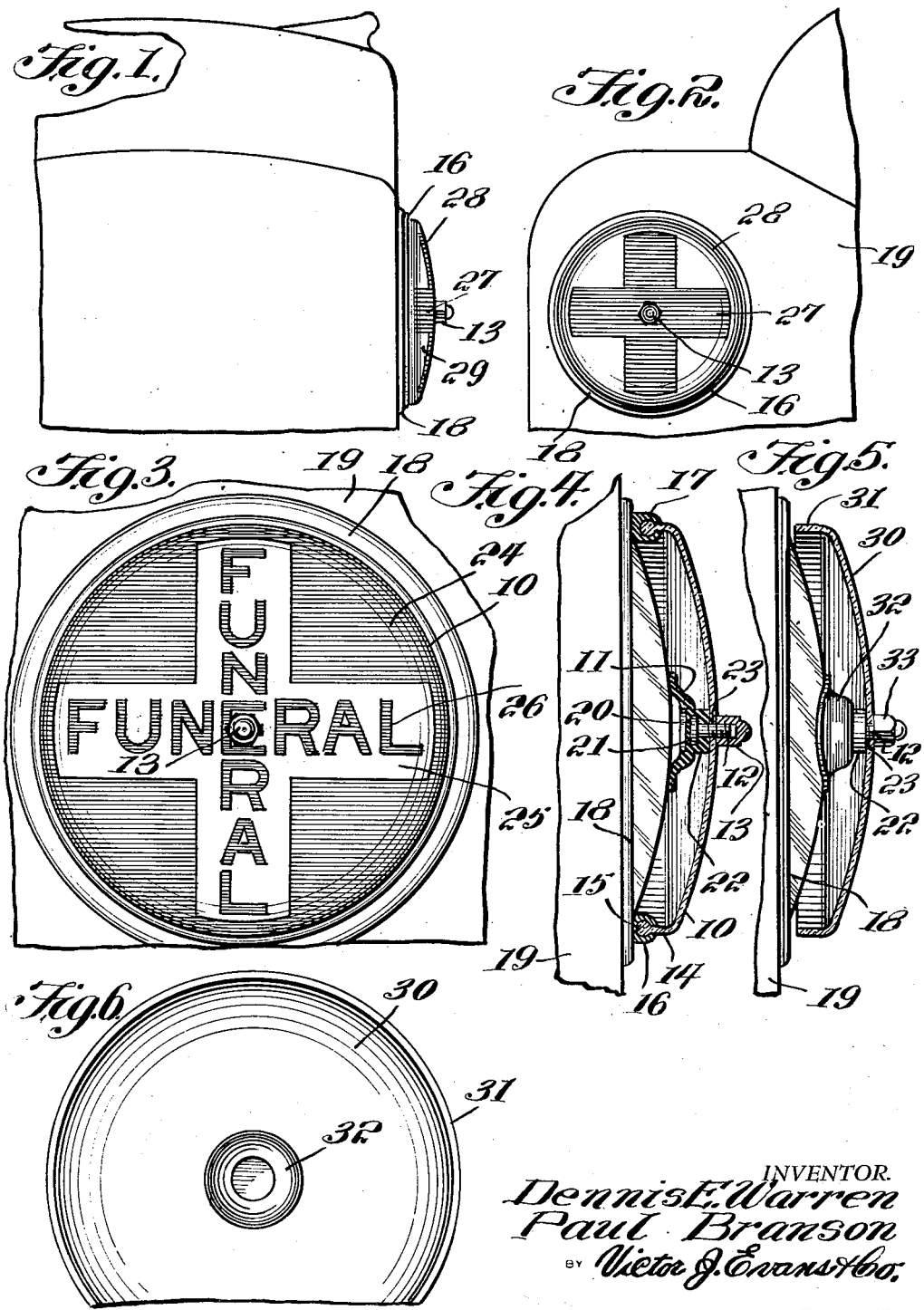
INVENTOR.
Dennis E. Warren
Paul Branson
BY Victor J. Evans & Co.
ATTORNEYS Patented May 13, 1952

2,596,879

UNITED STATES PATENT OFFICE 2,596,879

MOTOR VEHICLE HEADLIGHT MARKER

Dennis E. Warren and Paul Branson, Rockville, Ind.

Application September 27, 1949, Serial No. 117,986

1 Claim. (Cl. 40—130)

This invention relates to markers for identifying motor vehicles particularly in a procession, such as a funeral, and in particular includes a shield positioned over the lens of a motor vehicle headlight and secured in position on the lens by a vacuum cup having a screw etxended through the shield and in which characters or other indicating indicia are provided on the shield.

The purpose of this invention is to provide a temporary identification marker for motor vehicles that is positioned so that rays of lights of the vehicle pass therethrough and that is attached to the vehicle without marring or engaging a painted area thereof.

Various types of markers have been secured by an adhesive to windows and windshields of motor vehicles and other devices have been installed in combination with tail lights and headlights thereof, but for temporary use such as for identifying cars in a funeral it is desirable to provide a marker that is illustrated by a headlight and directly attached to the glass surface or lens of the headlight. With this thought in mind this invention contemplates a substantially transparent shield on which characters or other indicia are provided and means for temporarily attaching the shield over the lens of a headlight of a motor vehicle without bolts or screws or other mechanical means inserted in or attached to the metal areas of the vehicle.

The object of this invention is, therefore, to provide a substantially transparent shield with indicating indicia thereon and with means for temporarily securing the shield in position on the outer surface of the lens of a motor vehicle headlight.

Another object of the invention is to provide means for temporary mounting an indicating shield over a motor vehicle headlight without tools and without opening the headlights or removing parts thereof.

A further object of the invention is to provide a temporary marker with means for attaching the marker to the lens of a motor vehicle headlight, which is of a simple and economical construction.

With these and other objects and advantages in view the invention embodies a substantially saucer shaped shield having a rim positioned to engage the outer surface of the lens of the headlight and a vacuum cup for temporarily holding the shield to the outer surface of the headlight lens and having a screw extended through the shield by which the shield is mounted on the vacuum cup with a nut.

Other features and advantages of the invention will appear from the following description taken in connection with the drawings wherein:

Figure 1 is a side elevational view showing part of the forward end of a motor vehicle illustrating the marker positioned on the lens of a headlight on one side thereof and with parts of the vehicle broken away.

Figure 2 is a similar view showing a front elevation of the fender on one side of the vehicle and also with parts broken away.

Figure 3 has an enlarged detail illustrating the parts shown in Figure 2 and with parts broken away.

Figure 4 is a cross section through the marker illustrating the position of the marker on the outer surface of the lens of a headlight of a motor vehicle with the headlight and adjoining part of the vehicle shown in elevation, and wherein a resilient washer is provided around the rim of the shield.

Figure 5 is a similar view with the washer omitted and with the vacuum cup shown in elevation.

Figure 6 is a detail showing the inside of the marker with the lower part broken away.

Referring now to the drawings wherein like reference characters denote corresponding parts the motor vehicle marker of this invention includes a shield 10 and a vacuum cup 11 with the cup provided with a stud 12 and the shield secured on the stud by a nut 13.

In the design shown in Figure 4 the shield 10 is provided with a rim 14 having an annular bead 15 on the edge thereof and a rubber washer 16 having an open annular slit 17 in the outer surface is positioned over the head 15 to provide resilient contacting means between the periphery of the shield and outer surface of a lens 18 of a headlight of a motor vehicle 19.

The stud 12 is provided with a head 20 that is secured in a socket 21 in the hub 22 of the vacuum cup and the stud extends through an opening 23 in the center of the shield 10 so that a nut 13 may be threaded on the outer end to secure the shield against the outer end of the hub of the vacuum cup.

The shield 10 may be provided with shaded areas as indicated by the numeral 24 and the areas may be positioned to provide a cross 25 through which light rays of the headlight may pass. The clear section 25 may be provided with lettering 26 to provide definite indicating means.

The light and shaded areas may be reversed as illustrated in Figures 1 and 2 with a shaded area 27 in the form of a cross on a shield 28 and light areas 29 may be provided around a shaded area. The light and shaded areas may be arranged to provide any suitable design.

In the design illustrated in Figure 5 a shield 30 is provided with a rim 31, the peripheral edge of which bears directly against the outer surface of the lens 18 or, as illustrated in the drawings the inner edge of the rim 31 may be spaced from the surface of the lens. The shield is temporarily mounted on the lens by a vacuum cup 32 similar to the cup 11 and the cup is provided with a nut 33 similar to the nut 13.

With the parts arranged in this manner it is only necessary to press the marker against the outer surface of the lens of the headlight of a motor vehicle and the vacuum cup will temporarily hold the marker in position on the headlight. With the marker mounted in this manner it may readily be positioned on the headlight as a funeral procession starts and after the funeral the marker may readily be removed without damaging the paint or other parts of the vehicle.

It will be understood that modifications may be made in the design and arrangement of the parts without departing from the spirit of the invention.

What is claimed is:

A motor vehicle marker comprising a saucer shaped convex shield of partly transparent material, having a peripheral rim with an annular bead on the edge thereof and having a centrally positioned opening therethrough, a resilient washer U-shaped in cross section positioned over the bead on the rim of the shield, a vacuum cup having a threaded stud extended therefrom and positioned on the inside of the shield with the stud in the centrally disposed opening of the shield, and a nut threaded on the outer end of the stud temporarily mounting the shield on the said vacuum cup, said shield having marking indicia thereon.

DENNIS E. WARREN.
PAUL BRANSON.

REFERENCES CITED

The following references are of record in the file of this patent:

UNITED STATES PATENTS

| Number | Name | Date |
|---|---|---|
| 1,076,250 | Ulrich | Oct. 21, 1913 |
| 1,097,295 | Brown | May 19, 1914 |
| 1,556,648 | Symms | Oct. 13, 1925 |